(12) United States Patent
Mathew et al.

(10) Patent No.: US 7,693,925 B2
(45) Date of Patent: Apr. 6, 2010

(54) MULTIPLICAND SHIFTING IN A LINEAR SYSTOLIC ARRAY MODULAR MULTIPLIER

(75) Inventors: Sanu K. Mathew, Hillsboro, OR (US); David L. Harris, Upland, CA (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1160 days.

(21) Appl. No.: 11/242,573

(22) Filed: Sep. 30, 2005

(65) Prior Publication Data

US 2007/0203961 A1    Aug. 30, 2007

(51) Int. Cl.
*G06F 7/72*    (2006.01)

(52) U.S. Cl. .................................................... 708/491

(58) Field of Classification Search ................. None
See application file for complete search history.

(56) References Cited

U.S. PATENT DOCUMENTS 5,903,170 A * 5/1999 Kulkarni et al. ............. 326/134
6,061,706 A * 5/2000 Gai et al. .................... 708/491
7,240,204 B1 * 7/2007 Koc et al. ................... 713/174
2002/0172355 A1 * 11/2002 Lu et al. ........................ 380/28
2003/0065813 A1 * 4/2003 Ruehle ........................ 709/238
2004/0010530 A1 * 1/2004 Freking et al. .............. 708/491
2004/0210614 A1 * 10/2004 Chen et al. .................. 708/492

* cited by examiner

*Primary Examiner*—David H Malzahn
(74) *Attorney, Agent, or Firm*—Thomas R. Lane

(57) ABSTRACT

Embodiments of apparatuses and methods for multiplicand shifting in a linear systolic array modular multiplier are disclosed. In one embodiment, an apparatus includes two processing elements of a linear systolic array. One processing element includes multiplication logic, multiplicand shift logic, an adder, modulus logic, and modulus shift logic. The multiplication logic is to multiply a word of the multiplicand and a bit of the multiplier to generate a product. The multiplicand shift logic is to shift the word of the multiplicand. The adder is to add the product to a first running sum to generate a second running sum. The modulus logic is to conditionally add a word of a modulus and the second running sum. The modulus shift logic is to shift the word of the modulus. The next processing element includes logic to multiply the shifted word of the multiplicand and the next bit of the multiplier.

7 Claims, 9 Drawing Sheets

PE

|  | 211 | 212 | 213 |
|---|---|---|---|
| 201 | $X_0, Y^0, M^0, Z^0$ | | |
| 202 | $X_0, Y^1, M^1, Z^1$ | | |
| 203 | $X_0, Y^2, M^2, Z^2$ | $X_1, Y^0, M^0, Z^0$ | |
| 204 | $X_0, Y^3, M^3, Z^3$ | $X_1, Y^1, M^1, Z^1$ | |
| 205 | | $X_1, Y^2, M^2, Z^2$ | $X_2, Y^0, M^0, Z^0$ |
| 206 | | $X_1, Y^3, M^3, Z^3$ | $X_2, Y^1, M^1, Z^1$ |
| 207 | | | $X_2, Y^2, M^2, Z^2$ |
| 208 | | | $X_2, Y^3, M^3, Z^3$ |

Clock Cycle

| | 510 | 520 | 530 |
|---|---|---|---|
| 601 | $X_0$ $Y_0Y_1Y_2$ $M_0M_1M_2$ $Z_0Z_1Z_2$ | | |
| 602 | $X_0$ $Y_3Y_4Y_5$ $M_3M_4M_5$ $Z_3Z_4Z_5$ | $X_1$ $Y_{-1}Y_0Y_1$ $M_{-1}M_0M_1$ $Z_{-1}Z_0Z_1$ | |
| 603 | $X_0$ $Y_6Y_7Y_8$ $M_6M_7M_8$ $Z_6Z_7Z_8$ | $X_1$ $Y_2Y_3Y_4$ $M_2M_3M_4$ $Z_2Z_3Z_4$ | $X_2$ $Y_{-2}Y_{-1}Y_0$ $M_{-2}M_{-1}M_0$ $Z_{-2}Z_{-1}Z_0$ |
| 604 | $X_0$ $Y_9Y_{10}Y_{11}$ $M_9M_{10}M_{11}$ $Z_9Z_{10}Z_{11}$ | $X_1$ $Y_5Y_6Y_7$ $M_5M_6M_7$ $Z_5Z_6Z_7$ | $X_3$ $Y_1Y_2Y_3$ $M_1M_2M_3$ $Z_1Z_2Z_3$ |
| 605 | | $X_1$ $Y_8Y_9Y_{10}$ $M_8M_9M_{10}$ $Z_8Z_9Z_{10}$ | $X_3$ $Y_4Y_5Y_6$ $M_4M_5M_6$ $Z_4Z_5Z_6$ |
| 606 | | $X_1$ $Y_{11}Y_{12}Y_{13}$ $M_{11}M_{12}M_{13}$ $Z_{11}Z_{12}Z_{13}$ | $X_3$ $Y_7Y_8Y_9$ $M_7M_8M_9$ $Z_7Z_8Z_9$ |
| 607 | | | $X_3$ $Y_{10}Y_{11}Y_{12}$ $M_{10}M_{11}M_{12}$ $Z_{10}Z_{11}Z_{12}$ |

Clock Cycle

MULTIPLICAND SHIFTING IN A LINEAR SYSTOLIC ARRAY MODULAR MULTIPLIER

BACKGROUND

1. Field

The present disclosure pertains to the field of data processing, and more particularly, to the field of cryptography.

2. Description of Related Art

The computations required to implement many cryptographic protocols, such as the Rivest-Shamir-Adleman and Diffie-Hellman algorithms for public key encryption, include modular exponentiation. A straightforward approach to modular exponentiation requires dividing a multiplication product by a modulus to find the remainder. The modulus is typically a large number, so the division operation may be very slow. Therefore, a technique known as Montgomery multiplication may be used to perform modular exponentiation more efficiently.

Montgomery multipliers perform modular exponentiation using a transformation that allows the division operation to be replaced by shift operations. For example, the following radix-2 Montgomery multiplication algorithm computes the result, Z, from multiplier X, multiplicand Y, and modulus M, by generating and right shifting a running sum for each bit $x_i$ of the n-bit multiplier:

$$Z = 0$$
$$\text{for } i = 0 \text{ to } n-1$$
$$\quad Z = Z + x_i Y$$
$$\quad \text{if Z is odd then } Z = Z + M$$
$$\quad Z = Z/2$$
$$\quad \text{if } Z \geq M \text{ then } Z = Z - M$$

Some Montgomery multipliers include a linear systolic array, i.e., a chain of identical processing elements ("PE"s), where each PE works on a portion of the computation (e.g., four bits of a 1,024 bit number) at the same time. For example, in the following algorithm, the n-bit result Z, multiplicand Y, and modulus M are each broken down into e words, to allow each PE to work on a different word of the computation at the same time. In this algorithm, word positions are represented using superscripts, bit positions are represented using subscripts, and the concatenation of bits and/or words A and B is represented as (A,B).

$$Z = 0$$
$$\text{for } i = 0 \text{ to } n-1$$
$$\quad (C_a, Z^0) = x_i Y^0 + Z^0$$
$$\quad \text{odd} = z_0$$
$$\quad \text{if odd then}$$
$$\quad\quad (C_b, Z^0) = M^0 + Z^0$$
$$\quad \text{for } j = 1 \text{ to } e$$
$$\quad\quad (C_a, Z^j) = C_a + x_i Y^j + Z^j$$
$$\quad\quad \text{if odd then}$$
$$\quad\quad\quad (C_b, Z^j) = C_b + M^j + Z^j$$
$$\quad\quad Z^{j-1} = (Z_0^j, Z_{w-1:1}^{j-1})$$

In a typical hardware implementation of this algorithm, the iterations of a j-loop would occur sequentially in one PE, but the iterations of the i-loop would occur in different PEs, allowing the i-loop iterations to overlap. For example, the first PE would work on $x_0$, $Y^0$, $M^0$, and $Z^0$ during the first clock cycle; $x_0$, $Y^1$, $M^1$, and $Z^1$ during the second clock cycle; $x_0$, $Y^2$, $M^2$, and $Z^2$ during the third clock cycle; and so on. The second PE would work on $x_1$, $Y^0$, $M^0$, and $Z^0$; $x_1$, $Y^1$, $M^1$, and $Z^1$; $x_1$, $Y^2$, $M^2$, and $Z^2$; and so on, sequentially, but could not start until the third clock cycle. The reason for this delay is that the value of the first word of the running sum based on $x_0$ is not available until the first PE has worked with $x_0$, $Y^1$, $M^1$, and $Z^1$ in the second clock cycle, because the least significant bit of $Z^1$ must be shifted to the most significant bit of $Z^0$ in the last step of the j-loop for j=1.

BRIEF DESCRIPTION OF THE FIGURES

The present invention is illustrated by way of example and not limitation in the accompanying figures.

FIG. 2 is a timing diagram useful to explain the operation of a linear systolic array including three instances of the prior art processing element of FIG. 1.

FIG. 6 is a timing diagram useful to explain the operation of the modular multiplier of FIG. 5.

DETAILED DESCRIPTION

Embodiments of apparatuses and methods for multiplicand shifting in a linear systolic array modular multiplier are described. In the following description, numerous specific details, such as logic and circuit configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Figure 1:
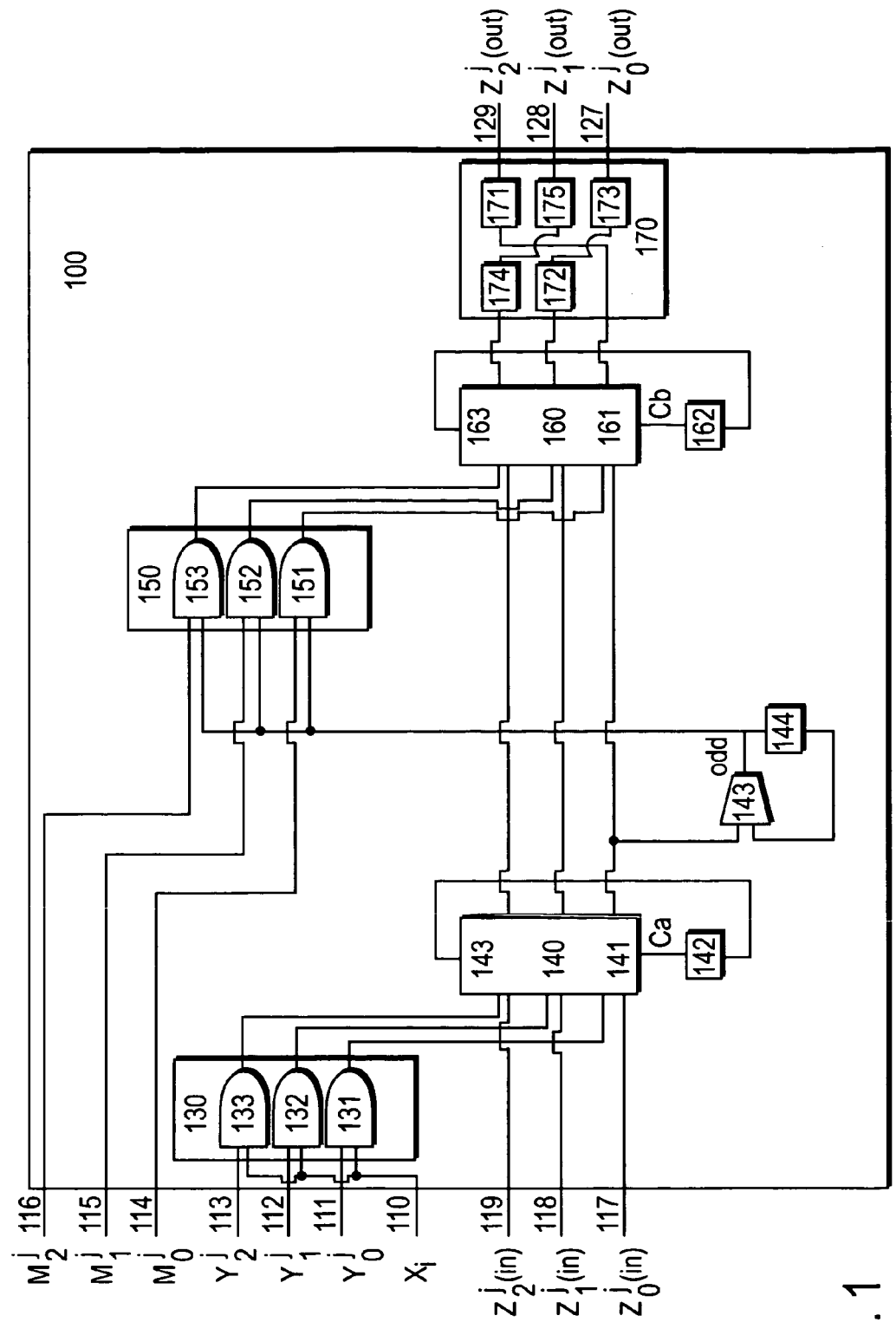
FIG. 1 illustrates a prior art processing element that may be used in a linear systolic array implementation of a word-based radix-2 Montgomery multiplication algorithm.

Embodiments of the present invention may be used to reduce the latency of modular multiplication in a linear systolic array. In some embodiments. the reduced latency may result in increased throughput. Embodiments may be used in dedicated cryptography hardware, in dedicated blocks in network or wireless processors, in accelerators for general purpose processors, or in any other hardware used to implement modular multiplication FIG. 1 illustrates prior art PE 100 that may be used in a linear systolic array implementation of a word-based radix-2 Montgomery multiplication algorithm. For purposes of illustration, the word size in FIG. 1 is three bits.

The data input ports of PE 100 are multiplier input port 110, multiplicand input ports 111, 112, and 113, modulus input ports 114, 115, and 116, and running sum input port 117, 118, and 119. Control input ports are not shown. The data output ports of PE 100 are running sum output ports 127, 128, and 129.

One bit of the multiplier, represented as $x_i$, is received on port 110; one word of the multiplicand, represented as bits 0, 1, and 2 of $Y^j$, is received on ports 111, 112, and 113; one word of the modulus, represented as bits 0, 1, and 2 of $M^j$, is received on ports 114, 115, and 116; and one word of the input running sum, represented as bits 0, 1, and 2 of $Z^j$(in) is received on ports 117, 118 and 119. As is known to those of ordinary skill in the art, a running sum such as $Z^j$(in) may be represented as a non-redundant binary number or in carry-save redundant form.

Three-bit by one-bit multiplier 130, formed from AND gates 131, 132, and 133, is used to compute the product of $x_i$ and $Y^j$. The product of $x_i$ and $Y^j$ is added to the input value of $Z^j$ by three-bit adder 140 to generate an interim value of $Z^j$. Carry-out port 143 of adder 140 is connected to the input of register 142, the output of which is connected to carry-in port 141 of adder 140, so that the carry-out from the addition of $x_i Y^j$ and the input value of $Z^j$, represented as $C_a$, is used as the carry-in for the addition of $x_i Y^{j+1}$ and the input value of $Z^{j+1}$ in the next clock cycle. As is known to those of ordinary skill in the art, adder 140 may be a carry propagate adder or a carry save adder.

The lowest order bit of the sum from adder 140 is fed into multiplexer 143, the output of which is returned to the other input of multiplexer 143 through register 144. In this configuration, multiplexer 143 may be controlled such that the lowest order bit of the interim value of $Z^0$ is selected and stored in register 144, and used as the variable "odd" to determine whether or not the modulus is added to the running sum.

If the lowest of bit of the interim value of $Z^0$ is a logical one, then three-bit by one-bit multiplier 150, formed from AND gates 151, 152, and 153, passes $M^j$ to three-bit adder 160, to be added to the output of adder 140. Carry-out port 163 of adder 160 is connected to the input of register 162, the output of which is connected to carry-in port 161 of adder 160, so that the carry-out from the conditional addition of $M^j$ and the interim value of $Z^j$, represented as $C_b$, is used as the carry-in for the conditional addition of $M^{j+1}$ and the interim value of $Z^{j+1}$ in the next clock cycle.

The output of adder 160 is processed by right shifter 170 to generate the output value of $Z^j$, represented as bits 0, 1, and 2 of $Z^j$(out). Shifter 170 is formed from registers 171, 172, 173, 174, and 175. The lowest order bit, bit 0, from the output of adder 160 passes through register 171 to running sum output port 129, so that the lowest order bit from the result of the computation of $Z^j$ by PE 100 during a particular clock cycle becomes the highest order bit, bit 2, of the running sum input word to the next PE for the next clock cycle, when that next PE is working on $Z^{j-1}$. Also, bit 1 from the output of adder 160 is passed through registers 172 and 173 to running sum output port 127, and bit 2 from the output of adder 160 is passed through registers 174 and 175 to running sum output port 128, so that each bit of the result of the computation of $Z^j$ by PE 100 during a particular clock cycle, except the lowest order bit, is right-shifted into the running sum input word to the next PE for the clock cycle after the next clock cycle, when that next PE is working on $Z^j$.

The multiplicand word Y and the modulus word M that is used by PE 100 must also be passed to the next PE to be used two clock cycles later. Therefore, these words also pass through two register stages, either or both of which may be inside PE 100.

FIG. 2 is a timing diagram useful to explain the operation of a linear systolic array including three instances of prior art PE 100, referred to as PE 211, PE 212, and PE 213 in FIG. 2. FIG. 2 shows the timing for three bits of multiplier X to be applied to four words of multiplicand Y and modulus M.

In clock cycle 201, PE 211 applies $x_0$ to $Y^0$, $M^0$, and $Z^0$. In clock cycle 202, PE 211 applies $x_0$ to $Y^1$, $M^1$, and $Z^1$. In clock cycle 203, PE 211 applies $x_0$ to $Y^2$, $M^2$, and $Z^2$, while PE 212 applies $x_1$ to $Y^0$, $M^0$, and $Z^0$. In clock cycle 204, PE 211 applies $x_0$ to $Y^3$, $M^3$, and $Z^3$, while PE 212 applies $x_1$ to $Y^1$, $M^1$, and $Z^1$. In clock cycle 205, PE 212 applies $x_1$ to $Y^2$, $M^2$, and $Z^2$, while PE 213 applies $x_2$ to $Y^0$, $M^0$, and $Z^0$. In clock cycle 206, PE 212 applies $x_1$ to $Y^3$, $M^3$, and $Z^3$, while PE 213 applies $x_2$ to $Y^1$, $M^1$, and $Z^1$. In clock cycle 207, PE 213 applies $x_2$ to $Y^2$, $M^2$, and $Z^2$. In clock cycle 208, PE 213 applies $x_2$ to $Y^3$, $M^3$, and $Z^3$.

Figure 3:
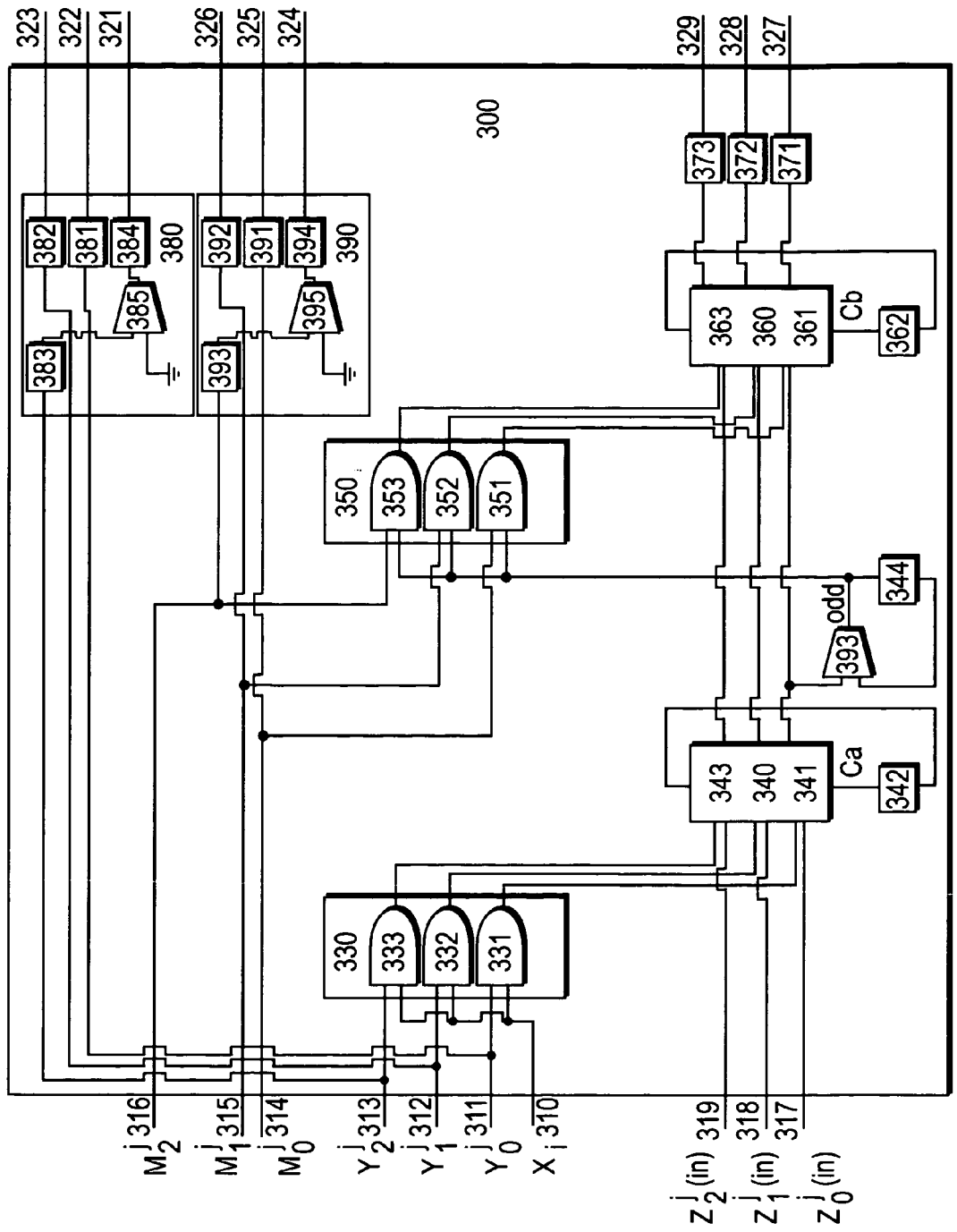
FIG. 3 illustrates an embodiment of the present invention in a processing element which may be used in a linear systolic array implementation of a word-based radix-2 Montgomery multiplication algorithm.

FIG. 3 illustrates an embodiment of the present invention in PE 300, which may be used in a linear systolic array implementation of a word-based radix-2 Montgomery multiplication algorithm. For purposes of illustration, the word size in FIG. 3 is three bits, however, the invention may be practiced with a word size of any number of bits.

The data input ports of PE 300 are multiplier input port 310, multiplicand input ports 311, 312, and 313, modulus input ports 314, 315, and 316, and running sum input ports 317, 318, and 319. Control input ports are not shown. The data output ports of PE 300 are multiplicand output ports 321, 322, and 323; modulus output ports 324, 325, and 326; and running sum output ports 327, 328, and 329.

One bit of the multiplier, represented as $x_i$, is received on port 310; one word of the input multiplicand, represented as bits 0, 1, and 2 of $Y^j$(in), is received on ports 311, 312, and 313; one word of the input modulus, represented as bits 0, 1, and 2 of $M^j$(in), is received on ports 314, 315, and 316; and one word of the input running sum, represented as bits 0, 1, and 2 of $Z^j$(in) is received on ports 317, 318 and 319.

Three-bit by one-bit multiplier 330, formed from AND gates 331, 332, and 333, is used to compute the product of $x_i$ and $Y^j$(in). Any alternative logic to compute the product of $x_i$ and $Y^j$(in) may be used within the scope of the present invention.

The product of $x_i$ and $Y^j$(in) is added to $Z^j$(in) by three-bit adder 340 to generate an interim value of $Z^j$. Three-bit adder 340 may be any type of adder, such as a carry-save adder or a carry-propagate adder, and $Z^j$(in) or any other input may be in redundant or non-redundant form. For ease of illustration, all inputs are represented in non-redundant form in FIG. 3.

In one embodiment, adder 340, as well as adder 360 described below, may be a carry-save adder that supports dual field operation, i.e., it may be configurable to handle cryptographic protocols in which carries are propagated, such as those using modular arithmetic in Galois Field GF(p), and in which carries are not propagated, such as those using modular arithmetic in Galois Field GF($2^m$).

Figure 4:
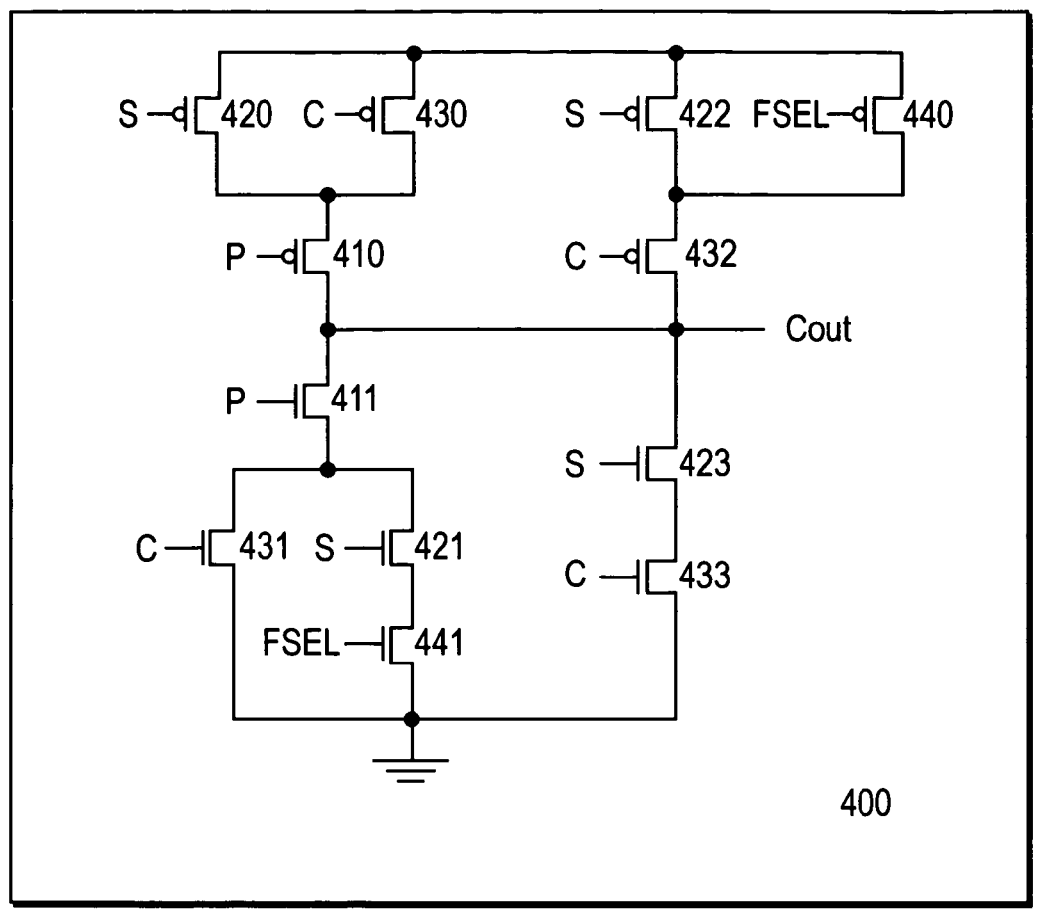
FIG. 4 illustrates carry logic for one bit of an adder that may be used in an embodiment of the invention to support dual field operation.

FIG. 4 illustrates carry logic 400 for one bit of an adder that may be used in an embodiment of the invention to support dual field operation. The sum logic for the adder may be any known three-input exclusive-or gate.

The inputs to carry logic 400 are represented as P. which may be one of the bits of the product $x_i$ and $Y^j$(in), S, which may be the corresponding bit of $Z^j$(in), C, which, depending on the bit position in which carry logic 400 is used, may be the carry-in to the adder, a carry-out from a lower order bit of the adder, or part of a carry-save redundant representation of $Z^j$(in), and FSEL, which may be a configuration variable used to select the field of operation for which the adder is configured.

In this embodiment, carry logic 400 is implemented in complementary metal-oxide-semiconductor (MOS) technology, using P-type (PMOS) and N-type (NMOS) transistors, although any technology may be used within the scope of the present invention.

In carry logic 400, the gates of PMOS transistor 410 and NMOS transistor 411 receive the P input. This configuration may be desired because the P input may be available later than the S or C inputs. The gates of PMOS transistors 420 and 422, and of NMOS transistors 421 and 423 receive the S input. The gates of PMOS transistors 430 and 432, and of NMOS transistors 431 and 433 receive the C input. The gates of PMOS transistor 440 and NMOS transistor 441 receive the FSEL input.

Therefore, the output of carry logic 400, which is represented as the complement of Cout, is always a logical one when both the FSEL input and the C input are logical zeroes. In other words, FSEL may be set to logical zero to kill carries. Carry logic 400 takes advantage of the knowledge that the C input will always be a logical zero when the FSEL input is a logical zero, by adding only two transistors, 440 and 441, to make carry logic 400 configurable, instead of adding all of the transistors that would be necessary to kill carries if the value of a carry-in could be a logical one. Therefore, carry logic 400 may be preferable to another implementation of carry logic for the adders of PE 300.

On the other hand, when FSEL is a logical one, the output of carry logic 400 will be a logical zero only when at least two of the three of the other inputs, P, S, and C, are logical ones. Therefore, when FSEL is a logical one, a carry-out will be generated if at least two of P, S, and C are logical ones. In other words, carry logic 400 behaves as an ordinary minority gate when FSEL is a logical one.

Returning now to FIG. 3, carry-out port 343 of adder 340 is connected to the input of register 342, the output of which is connected to carry-in port 341 of adder 340, so that the carry-out from the addition of $x_i Y^j(in)$ and $Z^j(in)$, represented as $C_a$, is used as the carry-in for the addition of $x_i Y^{j+1}(in)$ and $Z^{j+1}(in)$ in the next clock cycle.

The lowest order bit of the sum from adder 340 is fed into multiplexer 343, the output of which is returned to the other input of multiplexer 343 through register 344. In this configuration, multiplexer 343 may be controlled such that the lowest order bit of the interim value of $Z^0$ is selected and stored in register 344, and used as the variable "odd" to determine whether or not the modulus is added to the running sum. Register 344 and the other registers in FIG. 3 may be any storage element used in sequential logic, such as a pulsed latch or a flip-flop.

If the lowest of bit of the interim value of $Z^0$ is a logical one, then three-bit by one-bit multiplier 350, formed from AND gates 351, 352, and 353, passes $M^j(in)$ to three-bit adder 360, to be added to the output of adder 340.

Carry-out port 363 of adder 360 is connected to the input of register 362, the output of which is connected to carry-in port 361 of adder 360, so that the carry-out from the conditional addition of $M^j(in)$ and the interim value of $Z^j$, represented as $C_b$, is used as the carry-in for the conditional addition of $M^{j+1}(in)$ and the interim value of $Z^{j+1}$ in the next clock cycle.

Any other approach to or logic for the conditional addition of $M^j(in)$ and the interim value of $Z^j$, based on the variable "odd," may be used within the scope of the present invention.

Bits 0, 1, and 2 from the output of adder 360 are passed through registers 371, 372, and 373, respectively, to running sum output ports 327, 328, and 329, respectively, without shifting any bits to the right or to the left. Therefore, because the Montgomery multiplication algorithm calls for a right shift of the running sum at the end of each j-loop, if PE 300 generates bits 0, 1, and 2 of $Z^j$, they will be used as bit 3 of $Z^{j-1}$ and bits 0 and 1 of $Z^j$, respectively, by the next PE in the next clock cycle.

Therefore, that next PE in an embodiment of the present invention may work on all but the most significant bit of $Z^j$ in that next clock cycle, unlike the prior art approach using PE 100, where there is a two clock cycle delay between consecutive PEs working on $Z^j$, as described above in FIG. 2.

To provide for the next PE to work on all but the most significant bit of $Z^j$ in that next clock cycle, the multiplicand and modulus input words used by PE 100 are left-shifted by one bit before being passed to the next PE. This shifting is performed inside PE 300 in the embodiment of FIG. 3, but may also occur outside of a PE in other embodiments.

Multiplicand shifter 380 is formed from registers 381, 382, 383, and 384. Bit 0 of the multiplicand input word is passed through register 381 to multiplicand output port 322, and bit 1 of the multiplicand input word is passed through register 382 to multiplicand output port 323, so that each bit of the multiplicand input word to PE 300 for a particular clock cycle, except the highest order bit, is left-shifted into the multiplicand input word to the next PE for the next clock cycle, to line up with the running sum bits.

Additionally, the highest order bit, bit 2, of the multiplicand input word passes through registers 383 and 384 to multiplicand output port 321, so that the highest order bit of the multiplicand input word to PE 300 for a particular clock cycle becomes the lowest order bit, bit 0, of the multiplicand input word to the next PE for the clock cycle after the next clock cycle, when that next PE is working on bit 0 of $Z^j$ and bits 1 and 2 of $Z^{j+1}$. One exception to this rule is that when a PE is working on $Z^0$, a logical zero value is multiplexed into register 384 by multiplexer 385, because the data coming from register 383 in that case is not valid.

Modulus shifter 390 is formed from registers 391, 392, 393, and 394. Bit 0 of the modulus input word is passed through register 391 to modulus output port 325, and bit 1 of the modulus input word is passed through register 392 to modulus output port 326, so that each bit of the modulus input word to PE 300 for a particular clock cycle, except the highest order bit, is left-shifted into the modulus input word to the next PE for the next clock cycle, to line up with the running sum bits.

Additionally, the highest order bit, bit 2, of the modulus input word passes through registers 393 and 394 to modulus output port 324, so that the highest order bit of the modulus input word to PE 300 for a particular clock cycle becomes the lowest order bit, bit 0, of the modulus input word to the next PE for the clock cycle after the next clock cycle, when that next PE is working on bit 0 of $Z^j$ and bits 1 and 2 of $Z^{j+1}$. One exception to this rule is that when a PE is working on $Z^0$, a logical zero value is multiplexed into register 394 by multiplexer 395, because the data coming from register 393 in that case is not valid.

Any other approach to or logic for the shifting of the multiplicand and modulus words that achieves the same result as the logic described above may be used within the scope of the present invention.

Figure 5:
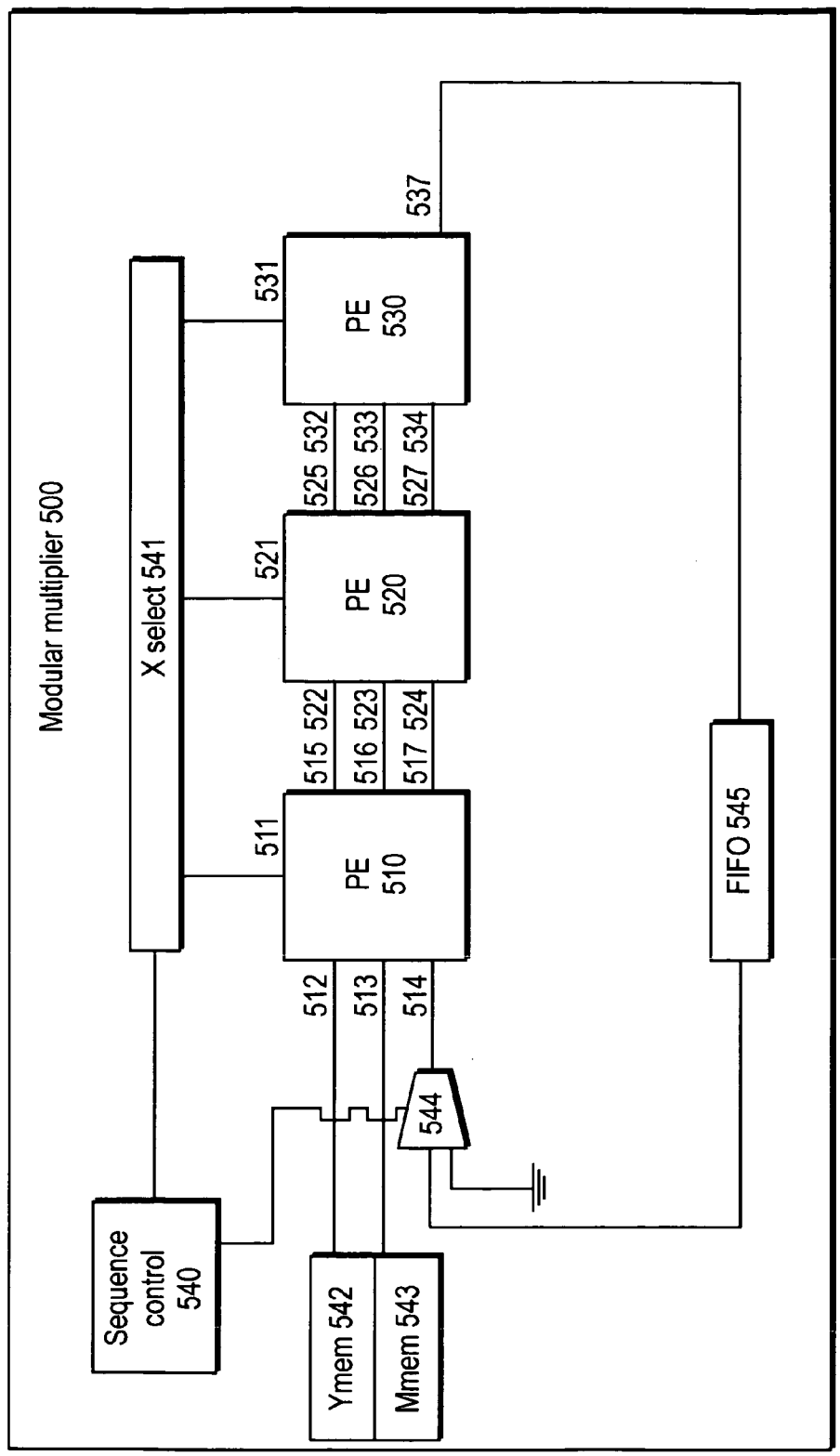
FIG. 5 illustrates a modular multiplier according to an embodiment of the present invention.

FIG. 5 illustrates modular multiplier 500 according to an embodiment of the present invention. Although any number of PEs may be used, modular multiplier 500 shows three PEs, PE 510, PE 520, and PE 530, each configured according to the embodiment of the invention illustrated in FIG. 3. As described above with respect to FIG. 3, the running sums are shown in FIG. 5 in non-redundant form, but in other embodiments they may be in redundant form, or converted one or more times between non-redundant and redundant form or vice-versa.

In PE 510, multiplier input port 511 receives a multiplier bit from multiplier bit selector 541, multiplicand input port 512 receives a multiplicand input word from multiplicand memory 542, modulus input port 513 receives a modulus input word from modulus memory 543, and running sum input port 514 receives a running sum input word from multiplexer 544. Multiplicand memory 542 and modulus memory 543 may be any type of memory and may be separate or combined.

In PE 520, multiplier input port 521 receives a multiplier bit from multiplier bit selector 541. PE 520 is coupled to PE 510 such that in PE 520, multiplicand input port 522 receives a multiplicand input word from multiplicand output port 515 of PE 510, modulus input port 523 receives a modulus input word from modulus output port 516 of PE 510, and running sum input port 524 receives a running sum input word from running sum output port 517 of PE 510.

In PE 530, multiplier input port 531 receives a multiplier bit from multiplier bit selector 541. PE 530 is coupled to PE 520 such that in PE 530, multiplicand input port 532 receives a multiplicand input word from multiplicand output port 525 of PE 520, modulus input port 533 receives a modulus input word from modulus output port 526 of PE 520, and running sum input port 534 receives a running sum input word from running sum output port 527 of PE 520.

First-in first-out register ("FIFO") 545 receives the running sum output from running sum output port 537 of PE 530. One input of multiplexer 544 receives the output of FIFO 545, and the other input of multiplexer 544 receives a logical zero value to initialize the running sum at the start of a multiplication.

Sequence controller 540 generates control signals (not shown in FIG. 5) to control modular multiplier 500, such that in the first clock cycle, PE 510 receives the lowest order multiplier bit, the lowest order multiplicand word, the lowest order modulus word, and a logical zero value for the running sum input word.

Sequence controller 540 also generates the control signal for the multiplexer in PE 510 that selects, in the first clock cycle, the lowest order bit of the interim value of the running sum to be used, and stored, as the variable "odd" to determine whether or not the modulus is added to the running sum. In all subsequent clock cycles in PE 510 using the lowest order multiplier bit, sequence controller 540 causes that multiplexer to select the stored value.

Similarly, sequence controller 540 generates the control signal for the multiplexers in PE 510 that select, in the first clock cycle, logical zero values for the lowest order bit of the output values of the running sum, the multiplicand, and the modulus. In all subsequent clock cycles in PE 510 using the lowest order multiplier bit, sequence controller 540 causes that multiplexer to select the value from the highest order bit of the previous clock cycle, as described above in connection with the description of FIG. 3.

In the second clock cycle, PE 520 receives the lowest order multiplicand word, the lowest order modulus word, and the lowest order running sum word from PE 510, after the left-shifts described above in connection with the description of FIG. 3. Also in the second clock cycle, PE 520 receives the second lowest order multiplier bit, and PE 510 receives the receives the lowest order multiplier bit, the second lowest order multiplicand word, the second lowest order modulus word, and a logical zero value for the running sum input word.

Sequence controller 540 also generates the control signal for the multiplexer in PE 520 that selects, in the second clock cycle, the lowest order bit of the interim value of the running sum to be used, and stored, as the variable "odd" to determine whether or not the modulus is added to the running sum. In all subsequent clock cycles in PE 520 using the second lowest order multiplier bit, sequence controller 540 causes that multiplexer to select the stored value.

Similarly, sequence controller 540 generates the control signal for the multiplexers in PE 520 that select, in the second clock cycle, logical zero values for the lowest order bit of the output values of the running sum, the multiplicand, and the modulus. In all subsequent clock cycles in PE 520 using the second lowest order multiplier bit, sequence controller 540 causes that multiplexer to select the value from the highest order bit of the previous clock cycle, as described above in connection with the description of FIG. 3.

Execution continues as such in modular multiplier 500. Since PE 530 is the third and last PE in modular multiplier 500, the running sum word from PE 530 after the third clock cycle should be the first data out of the linear systolic array based on the present inputs. However, in this implementation, where the number of bits in the word equals the number of PEs, this data represents the values in running sum bits positions that are less significant than the least significant valid bit position (i.e., bits −3, −2, and −1) and are ignored. Therefore, after the fourth clock cycle, the running sum words from PE 530 are stored in FIFO 545 until PE 510 is done applying the lowest order bit of the multiplier to the highest order word of the multiplier and the modulus, which may be padded with logical zeroes to prevent overflow. Then, the oldest valid running sum in FIFO 545 is recycled through the linear systolic array, followed by the next oldest, as so on, for PE 510 to apply the third lowest order multiplier bit.

FIG. 6 is a timing diagram useful to explain the operation of modular multiplier 500 of FIG. 5. FIG. 6 shows the timing for three bits of multiplier X to be applied to four words of multiplicand Y and modulus M. In this description of FIG. 6, bit positions that are less significant than the least significant valid bit position are represented as negative bit positions, and are ignored. Also, bit positions higher than the most significant bit, which is bit 11 in this example, represent zero padding.

In clock cycle 601, PE 510 applies $x_0$ to bits 0, 1, and 2 of Y, M, and Z. In clock cycle 602, PE 510 applies $x_0$ to bits 3, 4, and 5 of Y, M, and Z, while PE 520 applies $x_1$, to bits −1, 0, and 1 of Y, M, and Z. In clock cycle 603, PE 520 applies $x_0$ to bits 6, 7, and 8 of Y, M, and Z, while PE 520 applies $x_1$ to bits 2, 3, and 4 of Y, M, and Z, and PE 530 applies $x_2$ to bits −2, −1, and 0 of Y, M, and Z. In clock cycle 604, PE 510 applies $x_0$ to bits 9, 10, and 11 of Y, M, and Z, while PE 520 applies $x_i$ to bits 5, 6, and 7 of Y, M, and Z, and PE 530 applies $x_2$ to bits 1, 2, and 3 of Y, M, and Z. In clock cycle 605, PE 520 applies $x_1$ to bits 8, 9, and 10 of Y, M, and Z, while PE 530 applies $x_2$ to bits 4, 5, and 6 of Y, M, and Z. In clock cycle 606, PE 520 applies $x_1$ to bits 11, 12, and 13 of Y, M, and Z, while PE 530 applies $x_2$ to bits 7, 8, and 9 of Y, M, and Z. In clock cycle 607, PE 530 applies $x_2$ to bits 10, 11, and 12 of Y, M, and Z.

The result of the computation of FIG. 6 is available after seven clock cycles, compared to eight clock cycles in the prior art approach of FIG. 2. Different embodiments of the present invention may provide different latency reductions, depending on the number of PEs uses in the linear systolic area, the word size in each PE, and the number of words in the multiplicand and modulus. In particular, when the word length is relatively short and the number of PEs is relatively large, the present invention requires about half as many cycles as the prior art approach of FIG. 2 because it has a latency of one cycle rather than two between PEs.

Also note that the clock cycles referred to in this description may be any fraction or multiple of any clock used in the apparatus or method in which the invention is embodied, and the number and configurations of registers may vary accordingly. For example, the processing described above as being performed by a PE in one clock cycle may be performed in two clock cycles, and registers may be used to hold the interim values of the running sums between those two clock cycles.

Figure 7:
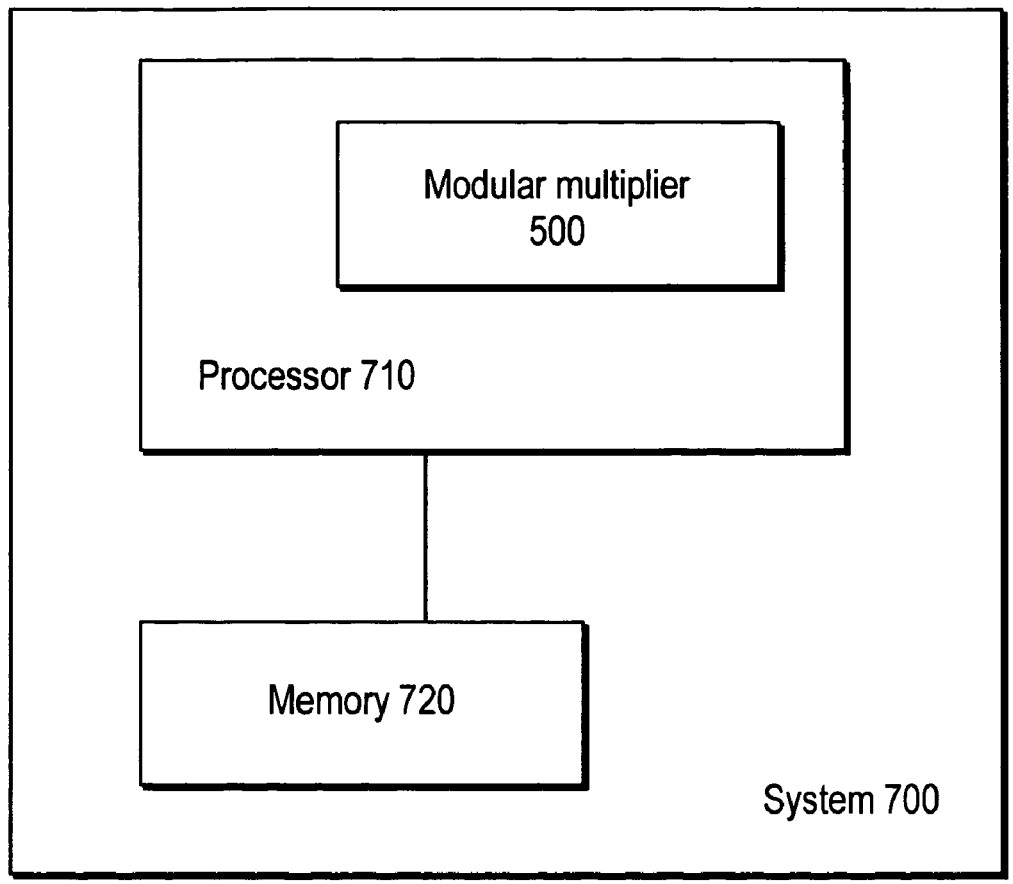
FIG. 7 illustrates an embodiment of the present invention in a system.

FIG. 7 illustrates an embodiment of the present invention in system 700. System 700 includes processor 710 and system memory 720. Processor 710 may be any cryptographic, network, wireless, general purpose or other processor, co-processor, or accelerator. Processor 710 includes modular multiplier 500, and may also include any other logic or circuitry.

System memory 720 may be any type of memory, such as semiconductor-based static or dynamic random access memory, semiconductor-based flash or read only memory, or magnetic or optical disk memory. In system 700, system memory 720 may be used to store the values of the multiplier, multiplicand, modulus, and running sum described above. In another embodiment, the modular multiplier may have local memory.

Processor 710 and system memory 720 may be coupled to each other in any arrangement, with any combination of buses or direct or point-to-point connections, and through any other components. System 700 may also include any number of buses, such as a peripheral bus, or components, such as input/output devices, not shown in FIG. 7.

Figure 8:
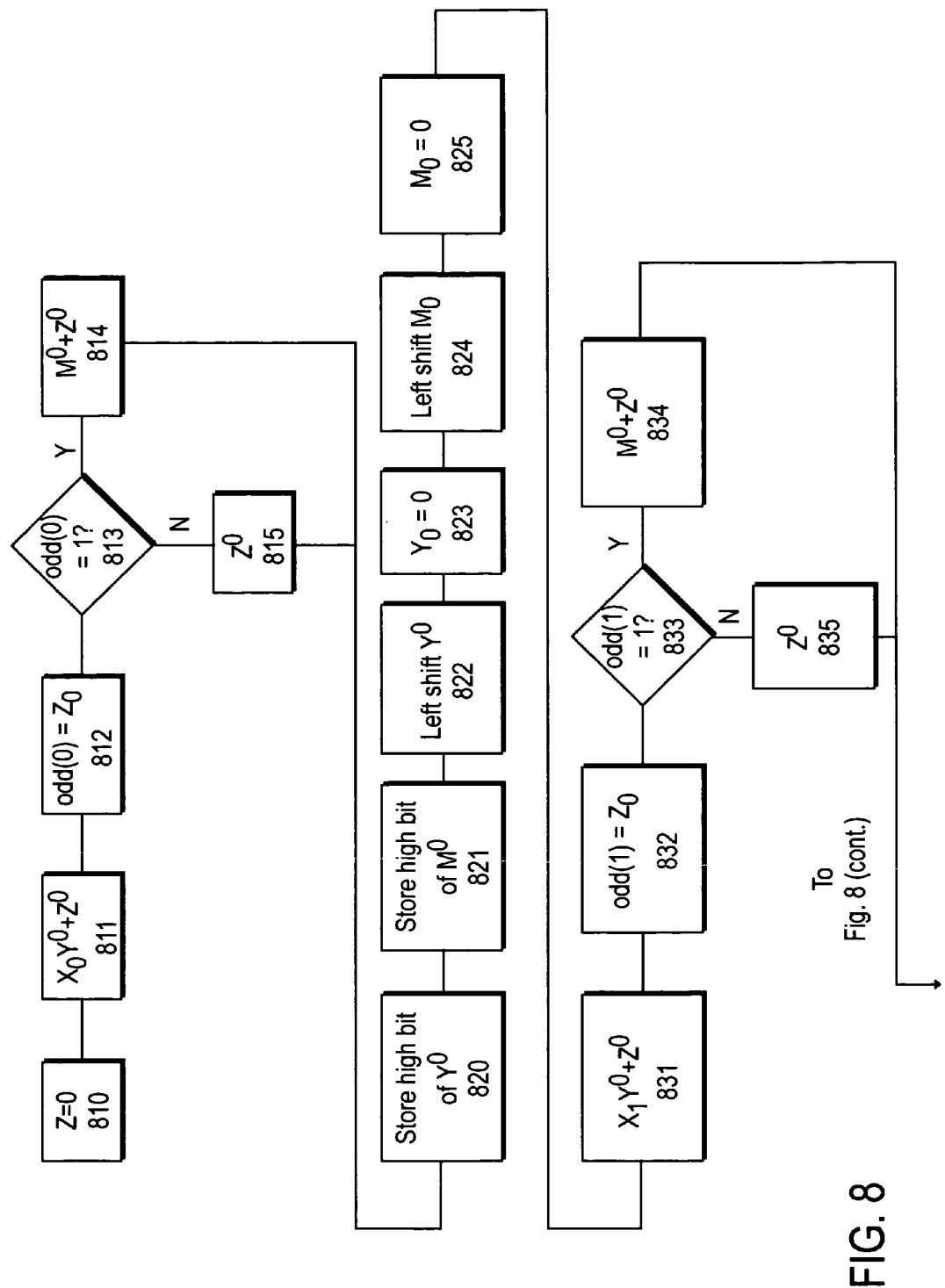
FIG. 8 illustrates a method for multiplicand shifting in a linear systolic array modular multiplier according to an embodiment of the present invention.
Figure 8:
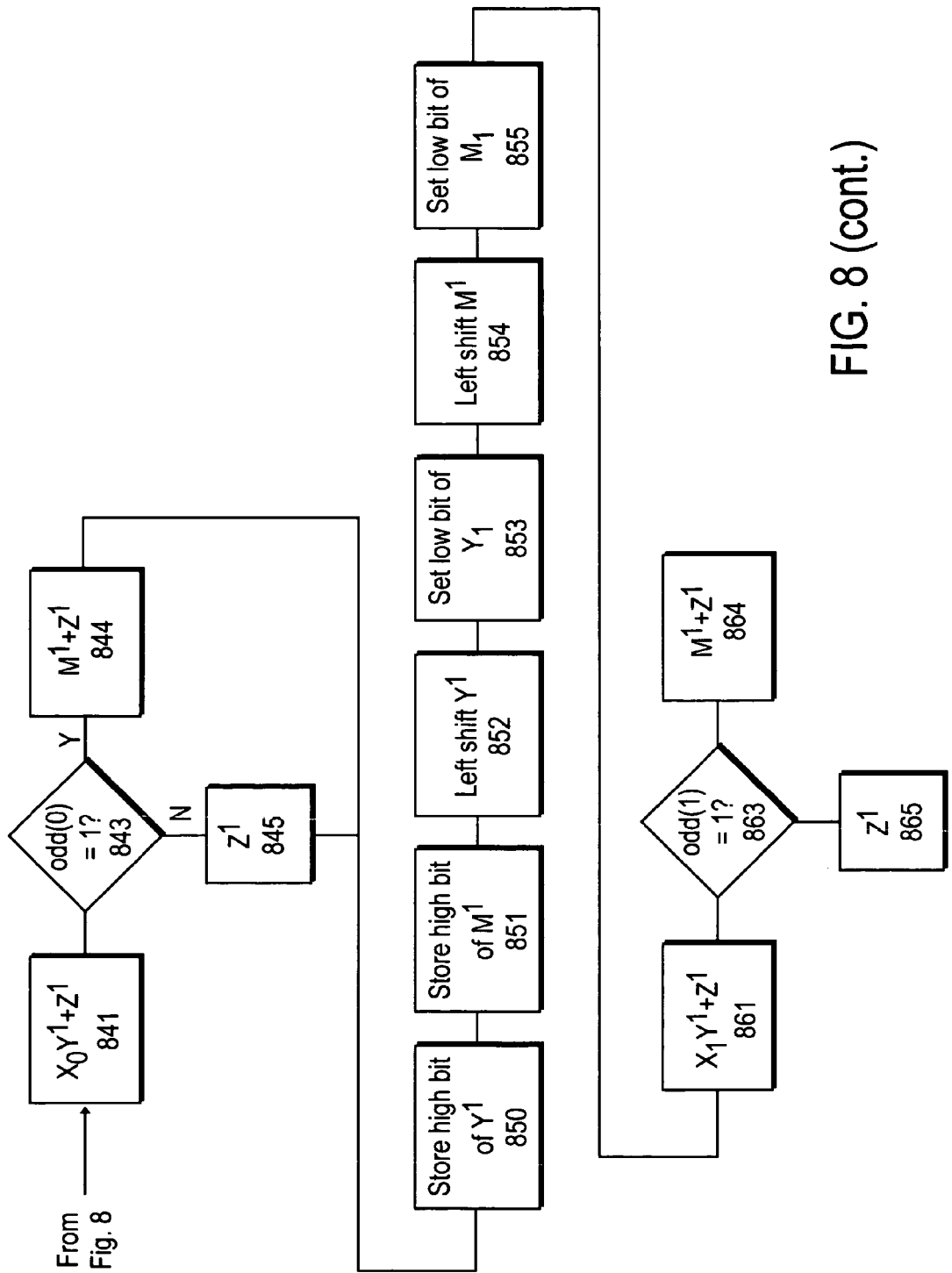

FIG. 8 illustrates a method for multiplicand shifting in a linear systolic array modular multiplier according to an embodiment of the present invention. The word size of the multiplicand, modulus, and running sum words referred to in this description of FIG. 8 may be any number of bits.

In box 810, a running sum is set to logical zero. In box 811, the lowest order word of a multiplicand is multiplied by the lowest order bit of a multiplier, and the product is added to the lowest order word of the running sum to generate a stage-one lowest order running sum interim word. In box 812, a variable "odd(0)" is set to the value of the lowest order bit of the stage-one lowest order running sum interim word. If odd(0) equals logical one in box 813, then, in box 814, the lowest order word of a modulus is added to the stage-one lowest order running sum interim word to generate a lowest order running sum output word and a carry-out. If odd(0) equals logical zero in box 813, then, in box 815, the lowest order running sum output word is set to the stage-one lowest order running sum interim word.

In box 820, the highest order bit of the lowest order word of the multiplicand is stored. In box 821, the highest order bit of the lowest order word of the modulus is stored. In box 822, the lowest order word multiplicand word is left shifted to generate a lowest order multiplicand output word. In box 823, the lowest order bit of the lowest order multiplicand output word is set to logical zero. In box 824, the input modulus word is left shifted to generate a lowest order modulus output word. In box 825, the lowest order bit of the lowest order modulus output word is set to logical zero.

In box 831, the lowest order multiplicand output word is multiplied by the second lowest order bit of the multiplier, and the product is added to the lowest order running sum output word to generate a stage-two lowest order running sum interim word and a carry-out. In box 832, a variable "odd(1)" is set to the value of the lowest order bit of the stage-two lowest order running sum interim word. If odd(1) equals logical one in box 833, then, in box 834, the lowest order modulus output word is added to the stage-two lowest order running sum interim word to generate a stage-two lowest order running sum output word and a carry-out. If odd(1) equals logical zero in box 833, then, in box 835, the stage-two lowest order running sum output word is set to the stage-two lowest order running sum interim word.

In box 841, the second lowest order word of the multiplicand is multiplied by the lowest order bit of a multiplier, and the product is added to the second lowest order word of a running sum to generate a stage-one second lowest order running sum interim word. If odd(0) equals logical one in box 843, then, in box 844, the second lowest order word of the modulus is added to the stage-one second lowest order running sum interim word, with a carry-in equal to the carry-out from box 814, to generate a second lowest order running sum output word and a carry-out. If odd(0) equals logical zero in box 843, then, in box 845, the second lowest order running sum output word is set to the stage-one second lowest order running sum interim word.

In box 850, the highest order bit of the second lowest order word of the multiplicand is stored. In box 851, the highest order bit of the second lowest order word of the modulus is stored. In box 852, the second lowest order word of the multiplicand is left shifted to generate a second lowest order multiplicand output word. In box 853, the lowest order bit of the second lowest order multiplicand output word is set to the value stored in box 820. In box 854, the second lowest order word of the modulus word is left shifted to generate a second lowest order modulus output word. In box 855, the lowest order bit of the second lowest order modulus output word is set to the value stored in box 821.

In box 861, the second lowest order multiplicand output word is multiplied by the second lowest order bit of the multiplier, and the product is added to the second lowest order running sum output word to generate a stage-two second lowest order running sum interim word. If odd(1) equals logical one in box 863, then, in box 864, the second lowest order modulus output word is added to the stage-two second lowest order running sum interim word, with a carry-in equal to the carry-out from box 834, to generate a stage-two second lowest order running sum output word. If odd(1) equals logical zero in box 863, then, in box 865, the second lowest order running sum output word is set to the stage-two second lowest order running sum interim word.

The method of FIG. 8 may continue to implement a complete Montgomery multiplication algorithm. Within the scope of the present invention, the method illustrated in FIG. 8 may be performed in a different order and/or with illustrated boxes performed in parallel, performed with illustrated boxes omitted, performed with additional boxes added, or performed with a combination of reordered, omitted, or additional boxes.

Some portions of the above descriptions have been presented in terms of algorithms and symbolic representations of operations on data bits within a computer system's registers or memory. These algorithmic descriptions and representations are the means used by those skilled in the data processing arts to effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may have proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is to be appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

Furthermore, processor 710, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses and methods for multiplicand shifting in a linear systolic array modular multiplier have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a first processing element of a linear systolic array, including:
      first multiplication logic to multiply a multiplicand input word by a first bit of a multiplier to generate a first product;
      first multiplicand shift logic to shift the multiplicand input word to generate a multiplicand output word;
      a first adder to add the first product and a first running sum to generate a second running sum;
      first modulus logic to conditionally add a modulus input word and the second running sum to generate a third running sum; and
      first modulus shift logic to shift the modulus input word to generate a modulus output word; and
   a second processing element of the linear systolic array, including:
      second multiplication logic to multiply the multiplicand output word by a second bit of the multiplier to generate a second product.

2. The apparatus of claim 1, wherein
the second processing element also includes:
   a second adder to add the second product and the third running sum to generate a fourth running sum;
   second modulus logic to conditionally add the modulus output word and the fourth running sum;
   second multiplicand shift logic to shift the multiplicand output word; and
   second modulus shift logic to shift the modulus output word.

3. The apparatus of claim 1, wherein the first processing element also comprises:
   a first storage element to store the highest order bit of the multiplicand input word in a first clock cycle to shift to the lowest order bit of the multiplicand output word in a second clock cycle; and
   a second storage element to store the highest order bit of the modulus input word in the first clock cycle, to shift to the lowest order bit of the modulus output word in the second clock cycle.

4. The apparatus of claim 3, wherein the first processing element also comprises:
   a third storage element to store the lowest order bit of the second running sum in a first clock cycle to qualify the conditional addition of the first modulus logic in a second clock cycle.

5. The apparatus of claim 1, wherein the first adder and the second adder are configurable to support dual field operation.

6. The apparatus of claim 5, wherein the first adder and the second adder each include carry logic to generate and propagate carries responsive to a first value of a field select input, and to kill carries responsive to a second value of the field select input.

7. A system comprising:
   a memory; and
   a processor including:
      a first processing element of a linear systolic array, having:
         first multiplication logic to multiply a multiplicand input word by a first bit of a multiplier to generate a first product;
         first multiplicand shift logic to shift the multiplicand input word to generate a multiplicand output word;
         a first adder to add the first product and a first running sum to generate a second running sum;
         first modulus logic to conditionally add a modulus input word and the second running sum to generate a third running sum; and
         first modulus shift logic to shift the modulus input word to generate a modulus output word; and
      a second processing element of the linear systolic away, having:
         second multiplication logic to multiply the multiplicand output word by a second bit of the multiplier to generate a second product.

* * * * *